(12) United States Patent
Choi et al.

(10) Patent No.: US 11,713,746 B2
(45) Date of Patent: Aug. 1, 2023

(54) SYSTEM FOR AND METHOD OF FREQUENCY CONTROL OF VARIABLE-SPEED WIND POWER GENERATOR

(71) Applicant: GREEN ENERGY INSTITUTE, Jeollanam-do (KR)

(72) Inventors: Hyenjun Choi, Jeollanam-do (KR); Jihoon Park, Jeollanam-do (KR); Hyewon Choi, Jeollanam-do (KR)

(73) Assignee: GREEN ENERGY INSTITUTE

( * ) Notice: Subject to any disclaimer, the term of this patent is extended or adjusted under 35 U.S.C. 154(b) by 545 days.

(21) Appl. No.: 16/966,216

(22) PCT Filed: Mar. 23, 2020

(86) PCT No.: PCT/KR2020/003928
§ 371 (c)(1),
(2) Date: Jul. 30, 2020

(87) PCT Pub. No.: WO2021/107284
PCT Pub. Date: Jun. 3, 2021

(65) Prior Publication Data
US 2022/0307469 A1   Sep. 29, 2022

(30) Foreign Application Priority Data

Nov. 29, 2019 (KR) .................... 10-2019-0157387

(51) Int. Cl.
*F03D 7/02* (2006.01)
*H02P 9/02* (2006.01)

(52) U.S. Cl.
CPC ............... *F03D 7/028* (2013.01); *H02P 9/02* (2013.01); *F05B 2270/1041* (2013.01); *F05B 2270/327* (2013.01)

(58) Field of Classification Search
CPC .... F03D 7/028; H02P 9/02; F05B 2270/1041; F05B 2270/327
See application file for complete search history.

(56) References Cited

U.S. PATENT DOCUMENTS 4,044,285 A * 8/1977 Plunkett ................. H02P 21/10
318/803
8,922,043 B1 * 12/2014 Kang ...................... F03D 7/043
290/55

(Continued)

FOREIGN PATENT DOCUMENTS

JP     2006050835 A     2/2006
JP     2009068379 A     4/2009

(Continued)

OTHER PUBLICATIONS

Kim, Yeonhee et al., Power Smoothing of a Variable-Speed Wind Turbine Generator Based on the Rotor Speed-Dependent Gain, The Korean Institute of Electrical Engineers, 2016, pp. 533-538, vol. 65 No. 4, The Korean Institute of Electrical Engineers, South Korea.

*Primary Examiner* — Tulsidas C Patel
*Assistant Examiner* — Thomas K Quigley
(74) *Attorney, Agent, or Firm* — Levenfeld Pearlstein, LLC (57) ABSTRACT

A system for and a method of frequency control of a variable-speed wind power generator are proposed. According to an implementation example of the present technology, there is an advantage in which the present technology may be involved in a frequency control of the system, thereby stabilizing the frequency of the system by controlling the frequency of the variable-speed wind power generator on the basis of a gain being varied according to a speed of a rotor.

4 Claims, 5 Drawing Sheets

(56) References Cited

U.S. PATENT DOCUMENTS

| | | | |
|---|---|---|---|
| 11,421,654 B2* | 8/2022 | Garcia | H02J 3/381 |
| 11,441,539 B2* | 9/2022 | Bonfiglio | F03D 7/0284 |
| 2006/0028025 A1* | 2/2006 | Kikuchi | H02P 9/006 |
| | | | 290/44 |
| 2010/0264885 A1* | 10/2010 | Olsen | F16H 61/444 |
| | | | 322/40 |
| 2014/0375054 A1* | 12/2014 | Kang | F03D 7/0284 |
| | | | 290/44 |
| 2016/0040653 A1* | 2/2016 | Kang | H02J 3/24 |
| | | | 290/44 |

FOREIGN PATENT DOCUMENTS

| | | | |
|---|---|---|---|
| KR | 101318124 B1 | 10/2013 |
| KR | 101398400 B1 | 5/2014 |
| KR | 101450147 B1 | 10/2014 |
| KR | 101687900 B1 | 12/2016 |

* cited by examiner

SYSTEM FOR AND METHOD OF FREQUENCY CONTROL OF VARIABLE-SPEED WIND POWER GENERATOR

TECHNICAL FIELD

The present invention relates to a system for and a method of frequency control of a variable-speed wind power generator and, more particularly, to a system for and a method of frequency control of a variable-speed wind power generator having a gain being varied according to a speed of a rotor of the variable-speed wind power generator.

BACKGROUND ART

A power system, which has a high penetration level of wind power, becomes to have system inertia less than a power system composed only of synchronous generators due to a maximum output control function, which is irrelevant with a system frequency change, of a variable-speed wind power generator. Therefore, it is difficult to maintain frequency in the power system that has a high penetration level of wind power. In particular, when wind speed continuously greatly fluctuates, output of a wind power generator also fluctuates greatly, making it difficult to maintain the system frequency within an allowable range. Accordingly, because some grid system operators even limit an output evaporation rate of a wind farm or require the wind farm to obligingly participate in the system frequency control, it is necessary to improve frequency control performance of the wind power generator.

In order to secure the frequency control performance of the wind power generator, a method of smoothing the output of the wind power generator using an additional energy storage device has been proposed but has a problem in that a smoothing effect is different depending on the capacity and the momentarily available capacity of the energy storage device which is additionally installed, and the economic efficiency deteriorates due to the additional cost required.

DOCUMENTS OF RELATED ART

1. Korean Patent No. KR 10-1687900

DISCLOSURE

Technical Problem

Accordingly, the present invention is to solve the above problems, and an objective of the present invention is to provide a system for and a method of frequency control of a variable-speed wind power generator that controls the frequency of the variable-speed wind power generator on the basis of a gain being varied according to a speed of a rotor.

Technical Solution

In order to accomplish the above objective, the present invention may provide a system for frequency control of a variable-speed wind power generator, the generator including a rotor, a maximum output control loop, and a frequency deviation loop, the system including: a maximum output control loop unit calculating output of the maximum output control loop according to a speed of the rotor; a frequency deviation loop unit calculating output of the frequency deviation loop based on a gain that changes according to a frequency deviation of the system and the speed of the rotor; and a controller calculating a reference output of the variable-speed wind power generator as the sum of the output of the maximum output control loop and the output of the frequency deviation loop and controlling a converter controller on the rotor side based on an output limit range and the reference output of the variable-speed wind power generator, wherein the gain is calculated according to the output calculated from the maximum output control loop, the output calculated from the frequency deviation loop, and a predetermined speed of the rotor.

The gain may be calculated according to the following equation in consideration of a minimum speed of the rotor capable of generating power when the speed of the rotor is less than the predetermined speed of the rotor, $$K_a(\omega_r) = \frac{k_g}{0.1/f_{nom}} \frac{z}{\omega_1 - \omega_{min}} (\omega_r - \omega_{min}) \omega_r^3$$

and may be calculated according to the following equation when the speed of the rotor is no less than the predetermined speed of the rotor.

$$K_s(\omega_r) = \frac{k_g z}{0.1/f_{nom}} \omega_r^3$$

There may be provided a method of frequency control of a variable-speed wind power generator according to another embodiment of the present invention, the generator including a rotor, a maximum output control loop, and a frequency deviation loop, the method including: calculating output of the maximum output control loop according to a speed of the rotor by a maximum output control loop unit; calculating output of the frequency deviation loop based on a gain that changes according to a frequency deviation of the system and the speed of the rotor by a frequency deviation loop unit; and calculating a reference output of the variable-speed wind power generator as the sum of the output of the maximum output control loop and the output of the frequency deviation loop, and controlling a converter controller on the rotor side based on an output limit range and the reference output of the variable-speed wind power generator by a controller, wherein the gain is calculated based on the output calculated from the maximum output control loop, the output of the frequency deviation loop, and a predetermined speed of the rotor.

The gain may be calculated according to the following equation in consideration of a minimum speed of the rotor capable of generating power when the speed of the rotor is less than the predetermined speed of the rotor, $$K_a(\omega_r) = \frac{k_g}{0.1/f_{nom}} \frac{z}{\omega_1 - \omega_{min}} (\omega_r - \omega_{min}) \omega_r^3$$

and may be calculated according to the following equation when the speed of the rotor is no less than the predetermined speed of the rotor.

$$K_z(\omega_r) = \frac{k_g z}{0.1/f_{nom}} \omega_r^3$$

Advantageous Effects

According to the present invention as described above, there is an advantage of providing a system for and a method of frequency control of a variable-speed wind power generator participating in the frequency control of the system by controlling the frequency of the variable-speed wind power generator on the basis of a gain being varied according to the speed of the rotor.

BEST MODE

Advantages and features of the present invention and methods of achievement thereof will be clarified with reference to accompanying drawings together with embodiments described below. Prior to this, when it is determined that a detailed description of known functions and configurations related to the present invention may unnecessarily obfuscate the subject matter of the present invention, it should be noted that the detailed description is omitted.

A power system consists of one system that generates electricity from generators and transmits the electricity to loads through a transmission system. A system operator should supply high-quality, high-efficiency, and high-reliability electricity to the loads through the operation of the generators. In order to supply high-quality electricity, the system operator should maintain a frequency of the power system within a predetermined range.

Accordingly, in Korea, when there is no external disturbance, it is stipulated that the system operator should keep the frequency within ±0.2 Hz at 60 Hz. To this end, the system operator maintains the frequency by controlling output of the generators connected to the power system.

Even though the system operator is obliged to maintain the frequency within a regulation, the frequency may fall outside a specified range due to external disturbances such as an increase or a decrease of a large load, or separation of a generator in operation. Such fluctuations in frequency will affect grid operation and the loads and generators connected to the power system. In terms of grid operation, it is difficult to adjust the voltage due to frequency fluctuation, and in the case of the loads, a stable electricity supply is not accomplished due to the frequency fluctuation.

In the case of the generator, vibration of a turbine increases due to a frequency drop, and the performance of a facility such as a cooling device necessary for the operation of the generator is deteriorated, and the continuous operation of the generator accompanies risk. In order to protect the generator from such effects, when the frequency drops equal to or below 58.5 Hz in Korea, the generator is set to be disconnected from the power system.

When the frequency drops due to an external disturbance, the system operator performs an inertia response of the generator and primary and secondary frequency control to maintain the frequency. When the system frequency decreases at a time of the external disturbance, the generator releases kinetic energy, which the generator has, to a rotor in response to inertia to reduce an initial frequency drop.

After that, the system operator prevents the frequency drop through a primary frequency control and helps frequency recovery. The primary frequency control is a control in which output is increased in proportion to an amount of frequency change by using spinning reserve power allocated to each generator in advance.

The frequency is recovered through the primary frequency control but is difficult to be recovered to the frequency that is one before the disturbance occurred. Accordingly, the secondary frequency control is performed, thereby restoring the system frequency to a value that is the one before the disturbance occurred.

The secondary frequency control is a control in which the system operator recovers the frequency to a value that is the one before the disturbance occurred through continuously commanding an output reference value of the generator to increase the output of the generator, putting a standby generator into service, or the like.

The present invention performs frequency control by adding an auxiliary control loop to a maximum output controller without a separate energy storage device in a variable-speed wind power generator.

Figure 1:
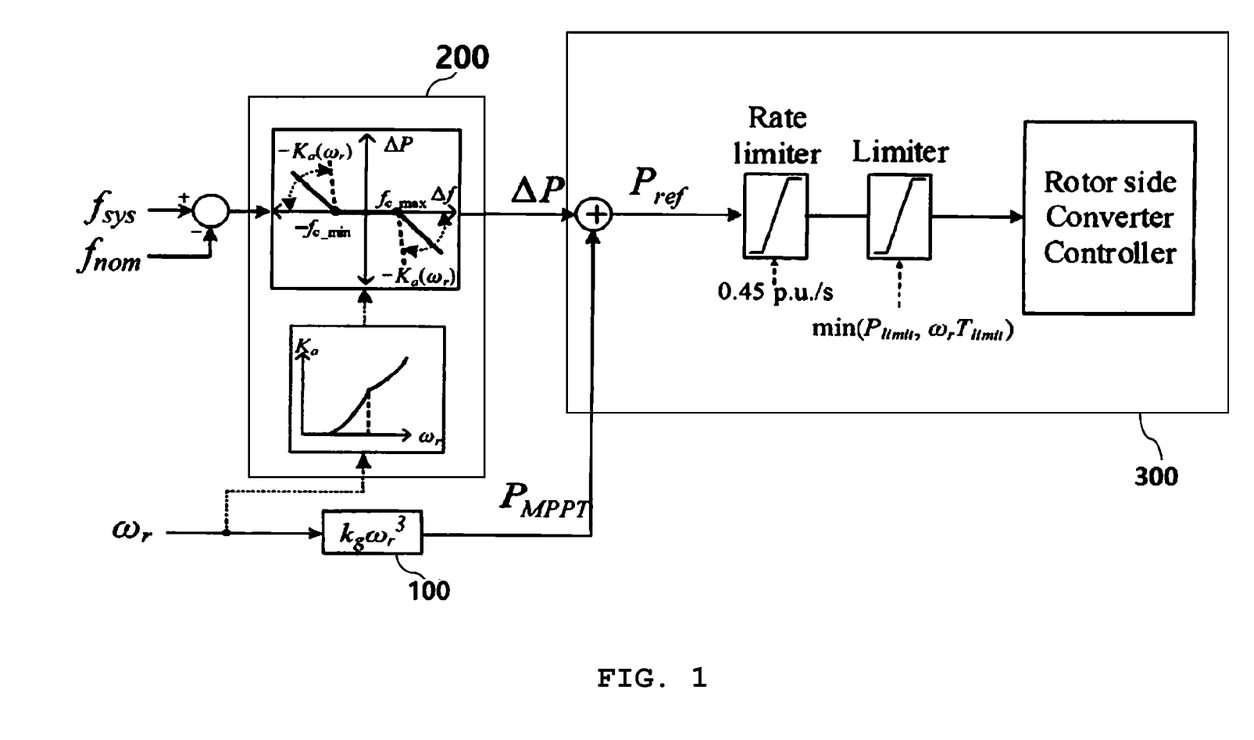
FIG. 1 is a block diagram showing a system for frequency control of a variable-speed wind power generator according to the present invention.

FIG. 1 is a block diagram showing a system for frequency control of a variable-speed wind power generator according to the present invention.

The present invention, in which the variable-speed wind power generator includes a rotor, a maximum output control loop, and a frequency deviation loop, includes a maximum output control loop unit 100, a frequency deviation loop unit 200, and a controller 300.

The maximum output control loop unit 100 calculates output $P_{MPPT}$ of the maximum output control loop according to a speed of the rotor.

The output of the maximum output control loop may be calculated according to $P_{MMPT} = k_g \omega_r^3$. Here, $k_g$ is a constant and may be, for example, 0.512, and $\omega_r$ is the speed of the rotor.

The frequency deviation loop unit 200 calculates output ΔP of the frequency deviation loop based on both a gain being changed according to a frequency deviation of the system and the speed of the rotor.

The output of the frequency deviation loop may be calculated according to equation 1 below.

$$\Delta P = \begin{cases} -K_a(\omega_r)(\Delta f - f_{c\_max}), & \text{for } f_{c\_max} \leq \Delta f \\ 0, & \text{for } -f_{c\_min} \leq \Delta f < f_{c\_max} \\ -K_a(\omega_r)(\Delta f + f_{c\_min}), & \text{for } \Delta f < -f_{c\_min} \end{cases} \quad \text{[Equation 1]}$$

Here, Δf is the frequency deviation, $f_{c\_max}$ is a maximum value of the frequency deviation allowed in the system, $f_{c\_min}$ is a minimum value of the frequency deviation allowed in the system, and $K_\alpha(\omega_r)$ is a gain of the frequency deviation loop.

Figure 2:
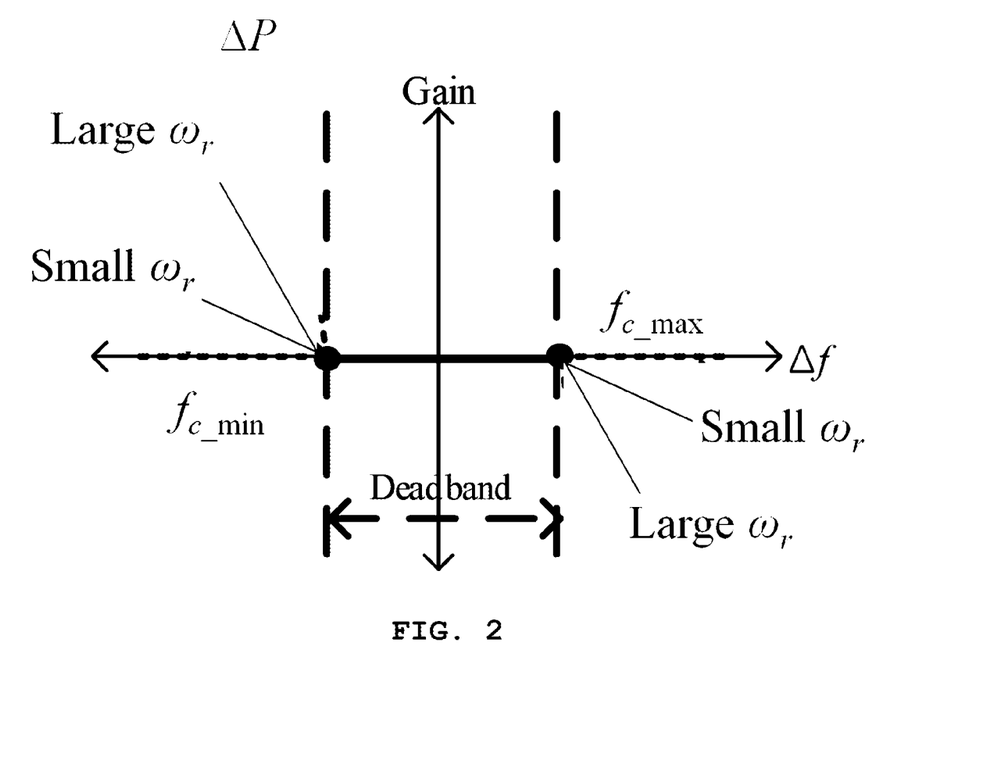
FIG. 2 shows a graph in which a slope of a gain change according to a frequency deviation Δf and a speed $\omega_r$ of a rotor may be compared.

FIG. 2 shows a graph in which a slope of a gain change according to the frequency deviation $\Delta f$ and the speed $\omega_r$ of the rotor may be compared.

In order to improve the output smoothing performance of the wind power generator, the larger the gain, the better the performance. However, when the gain is large in a section in which the speed of the rotor is low, the wind power generator emits a lot of energy, whereby the speed of the rotor is reduced and may reach the minimum operating limit value. In this case, the wind power generator separates an output smoothing loop so that the output of the wind power generator rapidly changes, thereby resulting in a rapid change in the system frequency.

Therefore, in a section in which the speed of the rotor is lower than the predetermined speed of the rotor, the value of the gain may be better to be gradually increased, and in a section in which the speed of the rotor is higher than the predetermined speed of the rotor, the value of the gain may be better to be increased corresponding to the $P_{MPPT}$ value.

The gain is calculated based on output calculated from the maximum output control loop, output calculated from the frequency deviation loop, and the predetermined speed of the rotor.

The gain $K_\alpha(\omega_r)$ may be determined by considering the output $P_{MPPT}$ of the maximum output control loop. That is, first, $\Delta P/P_{MPPT}(\omega_r)$ is considered, and the $K_\alpha(\omega_r)$ may be obtained therefrom. At this time, the speed of the rotor is divided into two sections by taking a predetermined speed $\omega_1$ of the rotor as a reference, whereby the $K_\alpha(\omega_r)$ may be obtained in a different method for each section.

Figure 3:
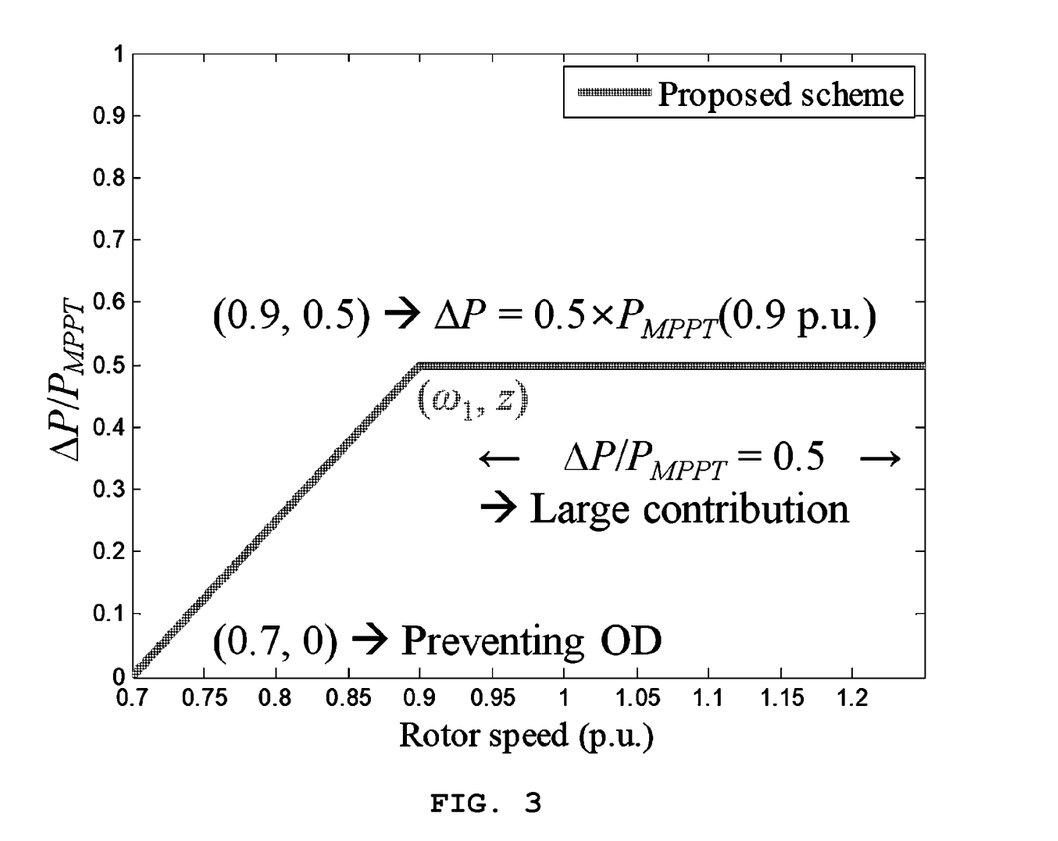
FIG. 3 is a view showing an example of a $\Delta P/P_{MPPT}$ graph when a predetermined speed of a rotor is 0.9 p.u.

FIG. 3 is a view showing an example of a $\Delta P/P_{MPPT}$ graph when a predetermined speed of the rotor is 0.9 p.u.

With reference to FIG. 3, the predetermined speed $\omega_1$ of the rotor is 0.9 p.u., and $\Delta P/P_{MPPT}$ in no less than $\omega_1$ is set to a constant z (=0.5). In addition, assuming the minimum speed of the rotor is 0.7 p.u., $\Delta P/P_{MPPT}$ is set to zero when the speed $\omega_r$ is 0.7 p.u.

The gain $K_\alpha(\omega_r)$ may be obtained from $\Delta P/P_{MPPT}(\omega_r)$ according to following equation 2.

$$\Delta P/P_{MPPT}(\omega_r) \xrightarrow[\times k_g \omega_r^3]{} \Delta P(\omega_r) \xrightarrow[\text{Divide by } \Delta f = 0.1 \text{ Hz}]{} K_a(\omega_r) \quad \text{[Equation 2]}$$

The gain may be calculated according to following equation 3 in consideration of the minimum speed $\omega_{min}$ of the rotor capable of generating power when the speed of the rotor is less than the predetermined speed of the rotor and may be calculated according to following equation 4 when the speed of the rotor is no less than the predetermined speed of the rotor.

$$K_a(\omega_r) = \frac{k_g}{0.1/f_{nom}} \frac{z}{\omega_1 - \omega_{min}} (\omega_r - \omega_{min}) \omega_r^3 \quad \text{[Equation 3]}$$

$$K_s(\omega_r) = \frac{k_g z}{0.1/f_{nom}} \omega_r^3 \quad \text{[Equation 4]}$$

Table 1 below shows a process of obtaining gain according to the same process as in equation 2 when the minimum speed of the rotor is assumed to be 0.7 p.u.

TABLE 1

| $\omega_r$ | $\Delta P/P_{MPPT}(\omega_r)$ | $\Delta P(\omega_r)$ | $K_a(\omega_r)$ |
|---|---|---|---|
| For $\omega_r < \omega_1$ | $\frac{\Delta P}{P_{MPPT}} = \frac{z}{\omega_1 - 0.7}(\omega_r - 0.7)$ | $\Delta P = \frac{z}{\omega_1 - 0.7}(\omega_r - 0.7)k_g\omega_r^3$ | $K_a(\omega_r) = \frac{z}{\omega_1 - 0.7}(\omega_r - 0.7)\frac{k_g}{0.1/f_{nom}}\omega_r^3$ |
| For $\omega_r \geq \omega_1$ | $\frac{\Delta P}{P_{MPPT}} = z$ | $\Delta P = zk_g\omega_r^3$ | $K_a(\omega_r) = \frac{zk_g}{0.1/f_{nom}}\omega_r^3$ |

For example, when $\omega_r < \omega_1$, $K_\alpha(\omega_r)$ may be calculated according to $$\frac{k_g}{0.1/f_{nom}} \frac{z}{\omega_1 - 0.7}(\omega_r - 0.7)\omega_r^3,$$

and when $\omega_r > \omega_1$, $K_\alpha(\omega_r)$ may be calculated according to $$K_a(\omega_r) = \frac{k_g z}{0.1/f_{nom}}\omega_r^3.$$

Figure 4:
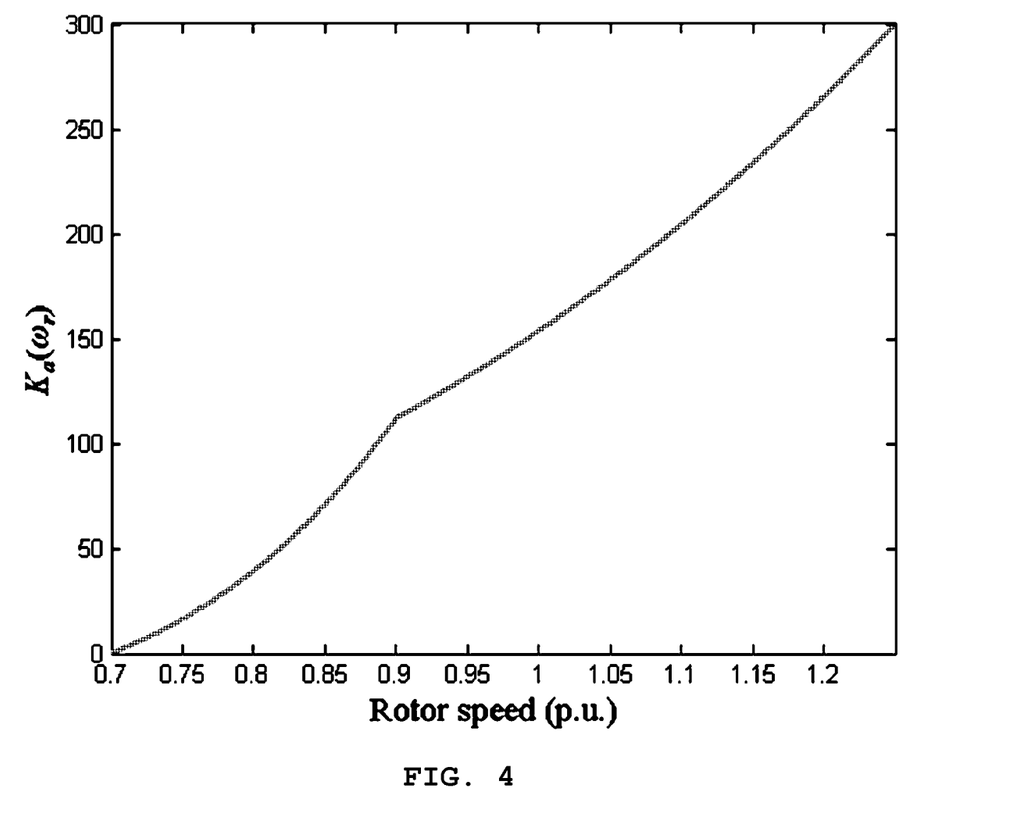
FIG. 4 is a graph showing a change in a frequency deviation loop gain according to the speed of the rotor of the present invention.

FIG. 4 is a graph showing a change in the frequency deviation loop gain according to the speed of the rotor of the present invention.

The controller 300 calculates reference output of the variable-speed wind power generator as the the sum of the output of the maximum output control loop and the frequency deviation loop and controls a converter controller on the rotor side based on the output limit range and the reference output of the variable-speed wind power generator.

The reference output $P_{ref}$ of the variable-speed wind power generator is calculated as the sum of the output $P_{MPPT}$ of the maximum output control loop and the output $\Delta P$ of the frequency deviation loop.

The output limit range for stable operation of the variable-speed wind power generator may be determined by limiting a speed ratio of the rotor with a limiter or by limiting the output value.

Figure 5:
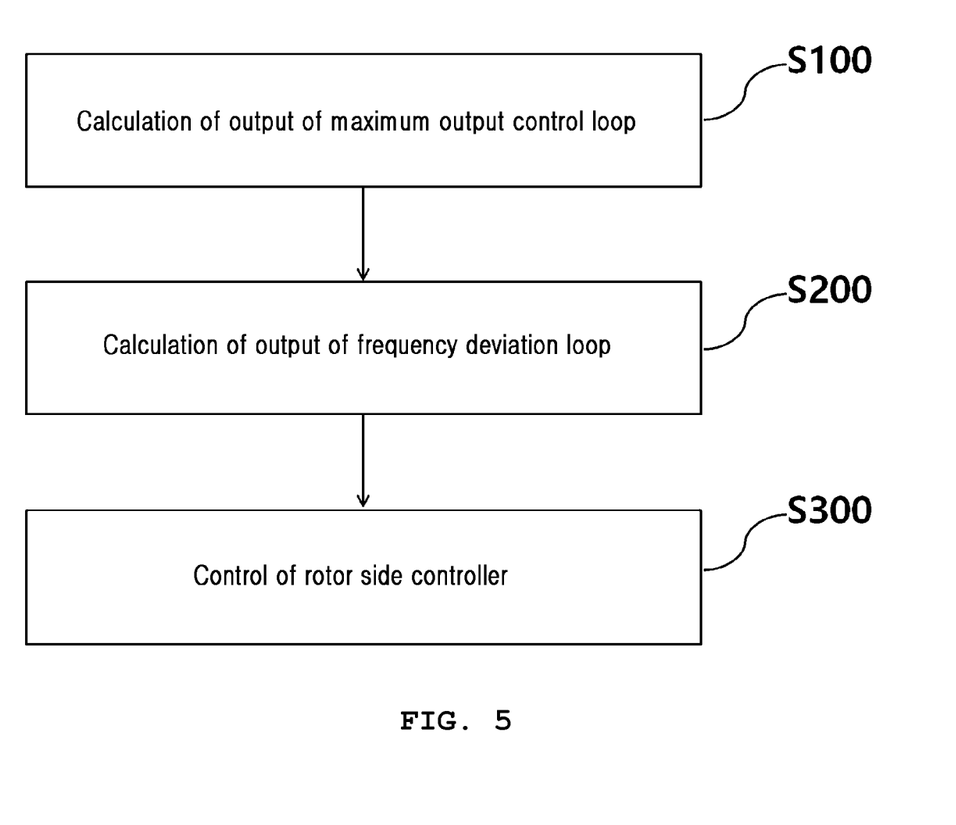
FIG. 5 is a view showing a flowchart of a method of frequency control of the variable-wind power generator according to the present invention.

FIG. 5 is a view showing a flowchart of a method of frequency control of the variable-wind power generator according to the present invention.

First, a maximum output control loop unit 100 calculates output of a maximum output control loop according to a speed of a rotor at S100. Subsequently, a frequency deviation loop unit 200 calculates output of a frequency deviation loop based on a gain that changes according to a frequency deviation of the system and the speed of the rotor at S200. Subsequently, a controller calculates reference output of a variable-speed wind power generator as the sum of the output of the maximum output control loop and the output of the frequency deviation loop and controls a converter controller on the rotor side based on an output limit range and the reference output of the variable-speed wind power generator at S300.

According to the present invention as described above, by optimizing the gain change of the frequency deviation loop according to the speed of the rotor and the like, more stable operation of the wind power generator may be ensured in a section in which the speed of the rotor is low. In addition, in a section in which the speed of the rotor is high, the frequency control contribution of the wind power generator may be further increased.

As described above, the present invention has been described and illustrated in connection with an exemplary embodiment for illustrating the technical idea of the present invention, but the present invention is not limited only to the configuration and operation as illustrated and described. In addition, it will be understood that many changes and modifications to the present invention are possible without departing from the scope of the technical idea. Accordingly, all such suitable changes and modifications and equivalents should also be considered to be within the scope of the present invention.

DESCRIPTION OF THE REFERENCE NUMERALS IN THE DRAWINGS

100: Maximum output control loop unit
200: Frequency deviation loop unit
300: Controller

The invention claimed is:

1. A system for frequency control of a variable-speed wind power generator, the generator comprising a rotor, a maximum output control loop, and a frequency deviation loop, the system comprising:
   a maximum output control loop unit calculating output of the maximum output control loop according to a speed of the rotor;
   a frequency deviation loop unit calculating output of the frequency deviation loop based on a gain that changes according to a frequency deviation of the system and the speed of the rotor; and
   a controller calculating a reference output of the variable-speed wind power generator as the sum of the output of the maximum output control loop and the output of the frequency deviation loop and controlling a converter controller on the rotor side based on an output limit range and the reference output of the variable-speed wind power generator,
   wherein the gain is calculated based on the output calculated from the maximum output control loop, the output calculated from the frequency deviation loop, and a predetermined speed of the rotor.

2. The system of claim 1, wherein, the gain is calculated according to the following equation in consideration of a minimum speed of the rotor capable of generating power when the speed of the rotor is less than the predetermined speed of the rotor, $$K_a(\omega_r) = \frac{k_g}{0.1/f_{nom}} \frac{z}{\omega_1 - \omega_{min}} (\omega_r - \omega_{min}) \omega_r^3$$

and is calculated according to the following equation when the speed of the rotor is no less than the predetermined speed of the rotor $$K_z(\omega_r) = \frac{k_g z}{0.1/f_{nom}} \omega_r^3.$$

3. A method of frequency control of a variable-speed wind power generator, the generator comprising a rotor, a maximum output control loop, and a frequency deviation loop, the method comprising:
   calculating output of the maximum output control loop according to a speed of the rotor by a maximum output control loop unit;
   calculating output of the frequency deviation loop based on a gain that changes according to a frequency deviation of the system and the speed of the rotor by a frequency deviation loop unit; and
   calculating a reference output of the variable-speed wind power generator as the sum of the output of the maximum output control loop and the output of the frequency deviation loop, and controlling a converter controller on the rotor side based on an output limit range and the reference output of the variable-speed wind power generator by a controller,
   wherein the gain is calculated based on the output calculated from the maximum output control loop, the output of the frequency deviation loop, and a predetermined speed of the rotor.

4. The method of claim 3, wherein, the gain is calculated according to the following equation in consideration of a minimum speed of the rotor capable of generating power when the speed of the rotor is less than the predetermined speed of the rotor, $$K_a(\omega_r) = \frac{k_g}{0.1/f_{nom}} \frac{z}{\omega_1 - \omega_{min}} (\omega_r - \omega_{min}) \omega_r^3$$

and is calculated according to the following equation when the speed of the rotor is no less than the predetermined speed of the rotor $$K_z(\omega_r) = \frac{k_g z}{0.1/f_{nom}} \omega_r^3.$$

* * * * *